April 11, 1967        G. MAYR        3,313,503

SUSPENSION FOR PIPES, ESPECIALLY EXHAUST LINES

Filed Jan. 14, 1966

INVENTOR
GÜNTER MAYR

BY *Dicke & Craig*

ATTORNEYS

United States Patent Office 3,313,503
Patented Apr. 11, 1967

3,313,503
SUSPENSION FOR PIPES, ESPECIALLY
EXHAUST LINES
Günter Mayr, Waiblingen, Germany, assignor to Daimler-Benz Aktiengesellschaft, Stuttgart-Unterturkheim, Germany
Filed Jan. 14, 1966, Ser. No. 520,766
Claims priority, application Germany, Jan. 19, 1965,
D 46,295
15 Claims. (Cl. 248—60)

The present invention relates to an arrangement for suspending a pipe, especially an exhaust line, at motor vehicles in which the pipe is connected with a central region of an elongated, heat-damming intermediate member extending transversely thereto, whose hook-shaped bent ends are suspended from the bottom side of the vehicle floor by means of laterally directed spring elements, prestressed in tension.

In one known suspension installation, cross struts, which carry the exhaust line, are connected therewith by welding. This known, prior art suspension arrangement has several disadvantages. The mounting and installation of the cross struts on the exhaust line requires a relatively large amount of work. Individual, damaged cross struts cannot be inter-changed in a simple manner. Exhaust lines provided with preassembled cross struts are bulky which impairs the bearing support thereof. The cross struts cannot be displaced along the exhaust line which may be necesasry with a deformation of the motor vehicle conditioned by age and/or accidents. A good heat transmission exists between the exhaust line and the cross struts so that the cross struts may assume a temperature which is non-permissively high for rubber elements eventually connected therewith.

A further, known suspension installation whose cross struts are threadably connected with the exhaust line, entails the disadvantage that the installation of the cross struts requires relatively large amounts of work and necessitates special structural elements for the threaded connection and in that a good heat transmission exists between the exhaust line and the cross struts which permits the cross struts to reach temperatures that are non-permissively high for the rubber elements connected therewith.

With another known suspension arrangement, rubber rings engage at pipe sleeves or bushings which are slipped over the exhaust line. This known suspension arrangement has the disadvantage that the pipe sleeves can only be installed by slipping the same over the pipe from the ends of the exhaust line and may be heated particularly easily to the temperatures harmful to the rubber rings.

The present invention avoids the disadvantages of the known suspension installations in that the intermediate member is a bent clamp of steel wire whose central region is a loop passing once around the pipe line. It is appropriate for the installation on smooth pipe lines, readily accessible from the ends thereof, that the loop surrounds the pipe in the form of a spiral winding whose pitch corresponds approximately to one diameter of the steel wire. It is thereby advantageous that the center region of the clamp forming the loop abuts resiliently against the pipe line. For the installation in exhaust lines with elbows, bent portions, branched lines or an exhaust muffler or for the repair of the suspension of already installed exhaust lines, it is recommended in accordance with the present invention that the loop surrounds the exhaust line in the form of a spiral winding whose pitch corresponds approximately to one diameter of the exhaust line, and the end regions of the clamp are bent back within a plane tangential to the exhaust line toward a central tangent of the spiral winding.

The securing clamps according to the present invention may be manufactured in an extraordinarily simple manner by bending of steel wire in fully automated machines and may be installed readily on the exhaust line without the use of tools. In operation, the clamps in accordance with the present invention do not reach high temperatures harmful to the rubber elements serving for the suspension thereof at the motor vehicle by reason of the point or line-shaped abutment thereof at the exhaust line.

Accordingly, it is an object of the present invention to provide a mounting and suspension means for exhaust pipes of motor vehicles which is simple in construction, easy to install, and avoids the aforementioned shortcomings and disadvantages encountered with the prior art constructions.

Another object of the present invention resides in å suspension means for suspending the exhaust line of motor vehicles from the bottom side of the vehicle floor which obviates the need for welded or threaded connections, can be readily interchanged and also axially displaced to assume the position which is necessary or most favorable under given circumstances.

A further object of the present invention resides in suspension means for exhaust pipes of motor vehicles which, in effect, minimize the transmission of heat to thereby also minimize damage to any elastic, rubber-like elements used in the suspension.

These and further objects, features, and advantages of the present invention will become more obvious from the following description when taken in connection with the accompanying drawing which shows, for purposes of illustration only, two embodiments in accordance with the present invention, and wherein.

Figure 1:
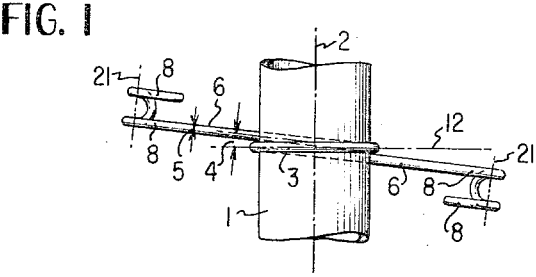
FIGURE 1 is a plan view on a first embodiment of a suspension installation for exhaust pipes in accordance with the present invention, in which the suspension means is loosely installed over an exhaust line.
Figure 2:
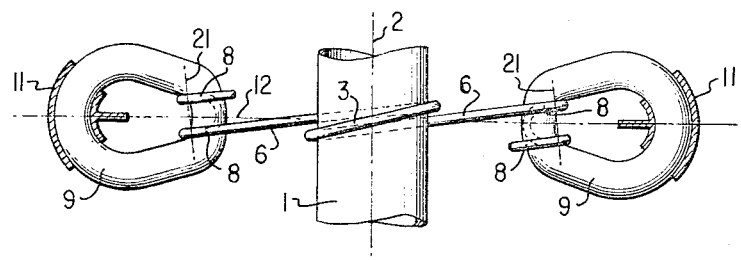
FIGURE 2 is a plan view, similar to FIGURE 1, and illustrating the suspension means in the fully installed condition thereof.
Figure 4:
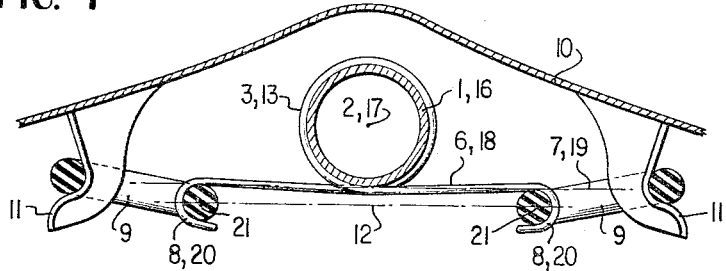
FIGURE 4 is a partial cross-sectional view through the installed suspension means in accordance with the present invention, illustrating both the embodiments of FIGURES 2 and 3.

Referring now to the drawing wherein like reference numerals are used throughout the various views to designate like parts, and more particularly to FIGURES 1 and 2, reference numeral 1 designates therein a conventional exhaust line or pipe over which is slipped in the direction of its axis 2 a clamp consisting of copper-plated steel wire. The center area of the clamp is constituted by a loop 3 which extends about the exhaust line 1 in the form of a spiral turn whose pitch 4 corresponds approximately to the diameter 5 of the steel wire. The end regions 6 of the clamp adjoining the loop 3, which lie in a plane 7 (FIG. 4) tangential to the exhaust line 1, are bent off twice at the outermost ends thereof and therewith form wide hooks 8. The double-hook configuration is believed obvious from an inspection, for example, of FIGURES 1 and 2 showing the two substantially U-shaped hooks and the curved connecting portion. The clamp is suspended on the hooks 8 thereof by means of rubber rings 9. The rubber rings 9, in turn, are inserted into hooks 11 connected in any suitable manner with the vehicle body floor 10 of the motor vehicle (FIG. 4). The rubber rings 9 exert on the clamp in the installed condition a strong lateral tension so that the centers of the hooks 8, which are mutually offset in the loose condition, are pulled along a connecting line 12 of the hooks 11 connected with the vehicle floor 10 whereby the loop 3 abuts securely against the exhaust line 1.

Figure 3:
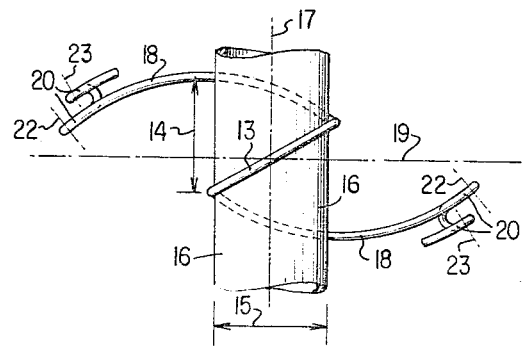
FIGURE 3 is a plan view on a second embodiment of a suspension means for an exhaust line in accordance with the present invention in which the suspension means is loosely installed over a continuous exhaust line.

In the second embodiment illustrated in FIGURES 3 and 4, which is adapted to be suspended by means of rubber rings from the bottom side of the motor vehicle floor in a manner similar to that of the first embodiment, the loop 13 constituted by the central portion of the clamp possesses a pitch 14 that corresponds approximately to the diameter 15 of the exhaust line 16 so that the clamp cannot only be slipped over one end of the exhaust line in the direction of the axis 17 thereof but may also be installed on a continuous exhaust line by temporary elastic deformation. The end regions 18 of the clamp are bent back within a plane 7 tangential to the exhaust line 16 in the direction toward a central tangent 19 of the spiral turn so that the wide hooks 20 seated at the end regions 18 are pulled (in the installed condition (not illustrated in detail) by rubber rings inserted therein the direction toward the central tangent 19 which forms simultaneously approximately the connecting line of hooks connected with the vehicle floor.

In both embodiments, the wide hooks 8 and 20 are formed by a double bending of the outer ends of the end regions 6 and 18, respectively, of the clamp. The end regions 6 and 18 are once bent back in opposite directions in the form of hairpins in the plane 7 tangential to the exhaust line 1 or 16 and therewith to the loop 3 or 13 and are additionally bent off approximately in the center of both leg portions of the hairpins about bending axes 21 or 22 and 23 extending approximately parallel to the axis 2 or 17, respectively. The bending axes 22 and 23 of the second embodiment are thereby mutually so offset to each other laterally and extend obliquely to the axis 17 of the loop 13 in such a manner that in the installed condition of the clamp, abutment surfaces of the hooks 20 are produced thereby which extend parallel to the axis 17.

While I have shown and described two embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. An exhaust pipe suspension device for a motor vehicle having an engine exhaust pipe, and first and second support members adapted to be rigidly attached to the frame structure of a vehicle on substantially diametrically opposed sides of an exhaust pipe, comprising: first and second elastomeric loop means for mounting on a corresponding one of the first and second support members, each of said loop means having an outside end for mounting on the corresponding support member and a substantially diametrically opposed inside end; a single wire having a rounded cross section and consisting essentially of a central portion having wire loop means for tightly engaging around the exhaust pipe with a substantially circumferential line contact, first and second terminal end portions, and first and second intermediate portions respectively integrally between said first terminal end portion and said central portion and integrally between said second terminal end portion and said central portion; and each of said first and second terminal end portions being formed as hook means for securely engaging an inside end of a corresponding one of said first and second elastomeric loop means.

2. The device according to claim 1, wherein each of said terminal ends consists essentially of two substantially semicircular portions disposed closely adjacent to each other in substantially parallel planes to open toward the exhaust pipe, and a third substantially semicircular portion integrally connecting said two substantially semicircular portions and disposed in a plane substantially perpendicular to the substantially parallel planes of said two substantially semicircular portions to constitute a broad hook.

3. The device according to claim 2, wherein said wire loop means has a relatively large pitch substantially equal to the diameter of said loop to form a spiral.

4. The device according to claim 3, wherein said two semicircular portions are substantially offset in their unassembled position and aligned in their flexed assembled position, each of said first and second intermediate portions being arcuately shaped as greater diameter extensions of the spiral formed by the loop means in the unassembled position and being substantially straight in the flexed assembled position.

5. The device according to claim 4, wherein said central portion consists of only a single loop.

6. The device according to claim 5, wherein said wire consists essentially of a steel inner wire and an outer copper coating covering the entire outer surface of said steel inner wire.

7. The device according to claim 6, wherein said single wire loop is of substantially smaller diameter than the exhaust pipe in the unassembled position.

8. The device according to claim 1, wherein said central portion consists of only a single loop.

9. The device of claim 8 wherein said single loop has a pitch substantially equal to the diameter of said wire and a diameter substantially smaller than the diameter of the exhaust pipe.

10. The device according to claim 8, wherein said wire loop means has a relatively large pitch substantially equal to the diameter of said loop to form a spiral.

11. The device according to claim 8, wherein each of said terminal ends consists essentially of two substantially semicircular portions disposed closely adjacent to each other in substantially parallel planes to open toward the exhaust pipe, and a third substantially semicircular portion integrally connecting said two substantially semicircular portions and disposed in a plane substantially perpendicular to the substantially parallel planes of said two substantially semicircular portions to constitute a broad hook.

12. In a motor vehicle, the combination comprising: an engine exhaust pipe; a vehicle frame; first and second support members rigidly attached to said frame on substantially diametrically opposite sides of said exhaust pipe; first and second elastomeric loop means mounted on a corresponding one of said first and second support members, each of said loop means having an outside end secured to the corresponding one of said support members and a substantially diametrically opposed inside end; a single wire having a substantially rounded cross section and consisting essentially of a central portion having loop means tightly engaging around said exhaust pipe with a substantially circumferential line contact, first and second terminal end portions, and first and second intermediate portions respectively integrally between said first terminal end portion and said central portion and integrally between said second terminal end portion and said central portion; each of said first and second terminal end portions being formed as hook means for securely engaging an inside end of a corresponding one of said first and second elastomeric loop means.

13. The combination according to claim 12, wherein said central portion consists of only a single loop.

14. The combination according to claim 12, wherein each of said terminal ends consists essentially of two substantially semicircular portions disposed closely adjacent to each other in substantially parallel planes to open toward said exhaust pipe, and a third substantially semicircular portion integrally connecting said two substantially semicircular portions and disposed in a plane substantially perpendicular to the substantially parallel planes of said two substantially semicircular portions to constitute a broad hook.

15. The combination according to claim 14, wherein said central portion consists of only a single loop.

References Cited by the Examiner
UNITED STATES PATENTS

| | | | |
|---|---|---|---|
| 396,677 | 1/1889 | Zimmerman | 248—71 |
| 397,037 | 1/1889 | Steussy | 248—74 |
| 499,549 | 6/1893 | Hunter et al. | 248—72 |
| 1,606,843 | 11/1926 | Pleister | 248—49 |
| 1,662,518 | 3/1928 | Jaffe et al. | 248—104 |
| 2,459,514 | 1/1949 | Flickinger | 248—107 |
| 2,636,703 | 4/1953 | Wallans | 248—58 |
| 3,204,901 | 9/1965 | Dunn | 248—74 |

FOREIGN PATENTS 788,624  7/1935  France.

CLAUDE A. LE ROY, *Primary Examiner.*